(12) United States Patent
Yang

(10) Patent No.: US 6,707,667 B1
(45) Date of Patent: Mar. 16, 2004

(54) INTEGRAL COMPUTER

(76) Inventor: Kuo-Yao Yang, No. 16, Lane 105, Chen Nan 6 St., Yung Kang, Tainan County (TW)

( * ) Notice: Subject to any disclaimer, the term of this patent is extended or adjusted under 35 U.S.C. 154(b) by 0 days.

(21) Appl. No.: 10/247,677

(22) Filed: Sep. 19, 2002

(51) Int. Cl.$^7$ .................................................. G06F 1/16
(52) U.S. Cl. ...................... 361/683; 381/87; 312/223.3; 348/794
(58) Field of Search ................................ 361/680–686; 364/708.1; 381/24, 87–88; D14/113–114; 312/223.1–223.6; 348/794

(56) References Cited

U.S. PATENT DOCUMENTS

| | | | | |
|---|---|---|---|---|
| 4,875,179 A | * | 10/1989 | Gelman | ...................... 361/681 |
| 6,480,372 B1 | * | 11/2002 | Vong et al. | .................. 361/680 |
| 6,535,379 B1 | * | 3/2003 | Smeenge et al. | ........... 361/683 |
| 6,545,863 B2 | * | 4/2003 | Huggins | ..................... 361/683 |

* cited by examiner

Primary Examiner—Hung Van Duong
(74) Attorney, Agent, or Firm—Alan Kamrath; Rider Bennett, LLP

(57) ABSTRACT

An integral computer comprises a monitor and computer assembly, a modular assembly having spaces for receiving components and peripherals and for future expansion, a front frame mechanism, and a rear cover. In another embodiment, the computer further comprises a lower support device comprising a pedestal having magnetic members for magnetically coupled to a keyboard, and a support plate integrally formed with the computer, the support plate being releasably secured to the pedestal. The invention can easily effect an angle adjustment of the monitor about the pedestal, a horizontal turning and height adjustment of the monitor, or a movement of the computer.

3 Claims, 8 Drawing Sheets

INTEGRAL COMPUTER

FIELD OF THE INVENTION

The present invention relates to personal computers and more particularly to an integral computer having improved characteristics such as storage space saving, reserved space for future expansion, easy adjustment of monitor angle about a supporting ground, horizontal turning and height adjustment of monitor, and movement.

BACKGROUND OF THE INVENTION

One characteristic of notebook computer is compact for saving a storage space. However, one drawback of the notebook computer is a lack of space for future expansion. For taking advantage of the advantageous benefit of notebook computer, a number of major computer manufacturers such as IBM Corp., Apple Computer, Inc., etc. have developed integral computers for tailoring the needs of consumers. Unfortunately, such integral computers also have the same drawback of lacking space for future expansion as the notebook computer. Thus, continuing improvements in the field of integral computer are constantly being sought.

SUMMARY OF THE INVENTION

It is therefore an object of the present invention to provide an integral computer comprising a keyboard; a monitor and computer assembly comprising a monitor, two side speakers, and a motherboard; a modular assembly disposed below the monitor and computer assembly and comprising a plurality of parallel first, second, and third racks from top to bottom wherein the first rack is used as a bottom plate for supporting the monitor and computer assembly, a first space formed between the first and the second racks for receiving a plurality of first electronic devices including at least one hard disk drive and a floppy disk drive, a second space formed between the second and the third racks for receiving a plurality of second electronic devices including a CD-ROM, a third space above the first rack at one side for receiving a plurality of third electronic devices including a power supply, a fourth space above the first rack at the other opposite side for receiving a plurality of cables interconnecting the monitor and computer assembly and a plurality of fourth electronic devices including a printer, a plurality of ports in the front, and a plurality of vent openings at either side for ventilation; and a frame mechanism sized to partially surround the modular assembly and comprising a front panel, a plurality of holes on the front panel for receiving the ports, and a wing plate at either side for clinging onto the modular assembly; and a rear cover comprising two side cabinets for enclosing the speakers and an intermediate opening for ventilation; wherein one or more of the plurality of spaces are reserved for future expansion.

It is another object of the present invention to provide an integral computer comprising a keyboard having two spaced metal members on a bottom; a monitor and computer assembly comprising a monitor, two side speakers, and a motherboard; a modular assembly disposed below the monitor and computer assembly and comprising a plurality of parallel first, second, and third racks from top to bottom wherein the first rack is used as a bottom plate for supporting the monitor and computer assembly, a first space formed between the first and the second racks for receiving a plurality of first electronic devices including at least one hard disk drive and a floppy disk drive, a second space formed between the second and the third racks for receiving a plurality of second electronic devices including a CD-ROM, a third space above the first rack at one side for receiving a plurality of third electronic devices including a power supply, a fourth space above the first rack at the other opposite side for receiving a plurality of cables interconnecting the monitor and computer assembly and a plurality of fourth electronic devices including a printer, a plurality of ports in the front, and a plurality of vent openings at either side for ventilation; a frame mechanism sized to partially surround the modular assembly and comprising a front panel, a plurality of holes on the front panel for receiving the ports, and a wing plate at either side for clinging onto the modular assembly; a rear cover comprising two side cabinets for enclosing the speakers and an intermediate opening for ventilation; and a lower support device comprising a pedestal comprising a shell on a top having a bore, a bottom thread hole, a side hole, and a first fastener driven through the side hole, a second fastener driven into the thread hole, two opposite openings, a cylindrical first connection mechanism sized to fit into the bore and including a cylindrical portion being rested on the second fastener and fastened by the first fastener, a top lug, and a lateral hole through the top lug, a second connection mechanism including a top disk, two spaced lower lugs for tightly receiving the top lug therebetween, each lower lug having a through hole, and a third fastener driven through the through holes of the lower lugs and the lateral holes of the top lug for fastening the first and the second connection mechanisms together, and two magnetic members fitted into the openings, the magnetic members being releasably, magnetically coupled to the metal members; and a support plate integrally formed with a bottom of the computer, the support, plate being secured to the second connection mechanism; wherein one or more of the plurality of spaces are reserved for future expansion; an angle adjustment of the monitor about the first connection mechanism is done by unfastening the third fastener, pivoting the monitor until a predetermined angle is reached, and fastening the third fastener; a horizontal turning of the computer is done by unfastening the first fastener, turning the computer until a predetermined degree is reached, and fastening the first fastener; a height adjustment of the computer is done by unfastening the first fastener for removing the first connection mechanism from the bore, adjusting the second fastener to leave a predetermined portion thereof in the bottom thread hole, and putting the first connection mechanism in the bore prior to fastening the first fastener; and a movement of the computer is done by placing the keyboard on the pedestal to magnetically attract the metal members by the magnetic members prior to carrying the computer to a predetermined location.

The above and other objects, features and advantages of the present invention will become apparent from the following detailed description taken with the accompanying drawings.

DETAILED DESCRIPTION OF THE PREFERRED EMBODIMENTS

Figure 1:
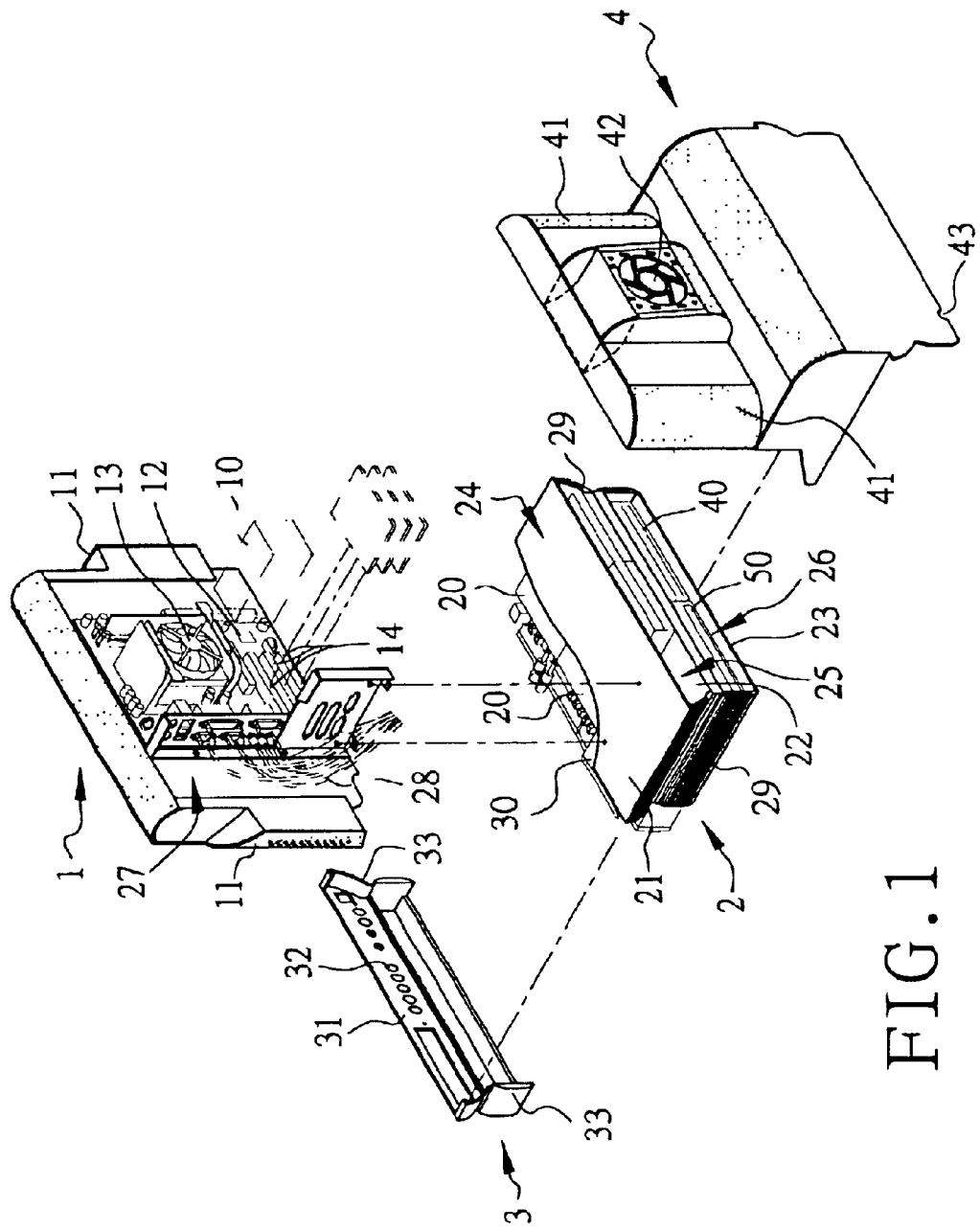
FIG. 1 is an exploded view of a first preferred embodiment of an integral computer according to the invention where keyboard is not shown for the sake of simplicity.
Figure 2:
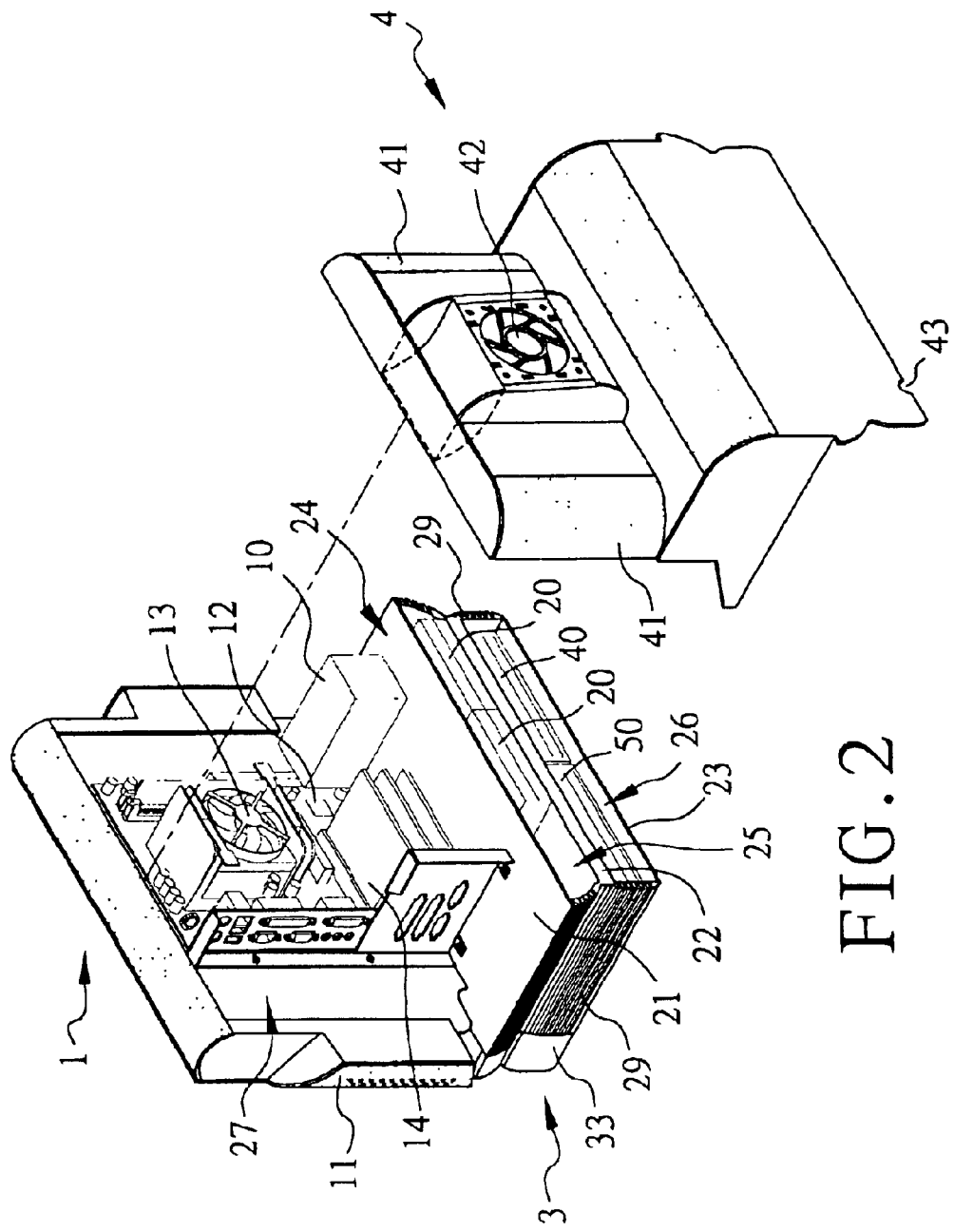
FIG. 2 is a perspective view of the yet fully assembled computer.
Figure 3:
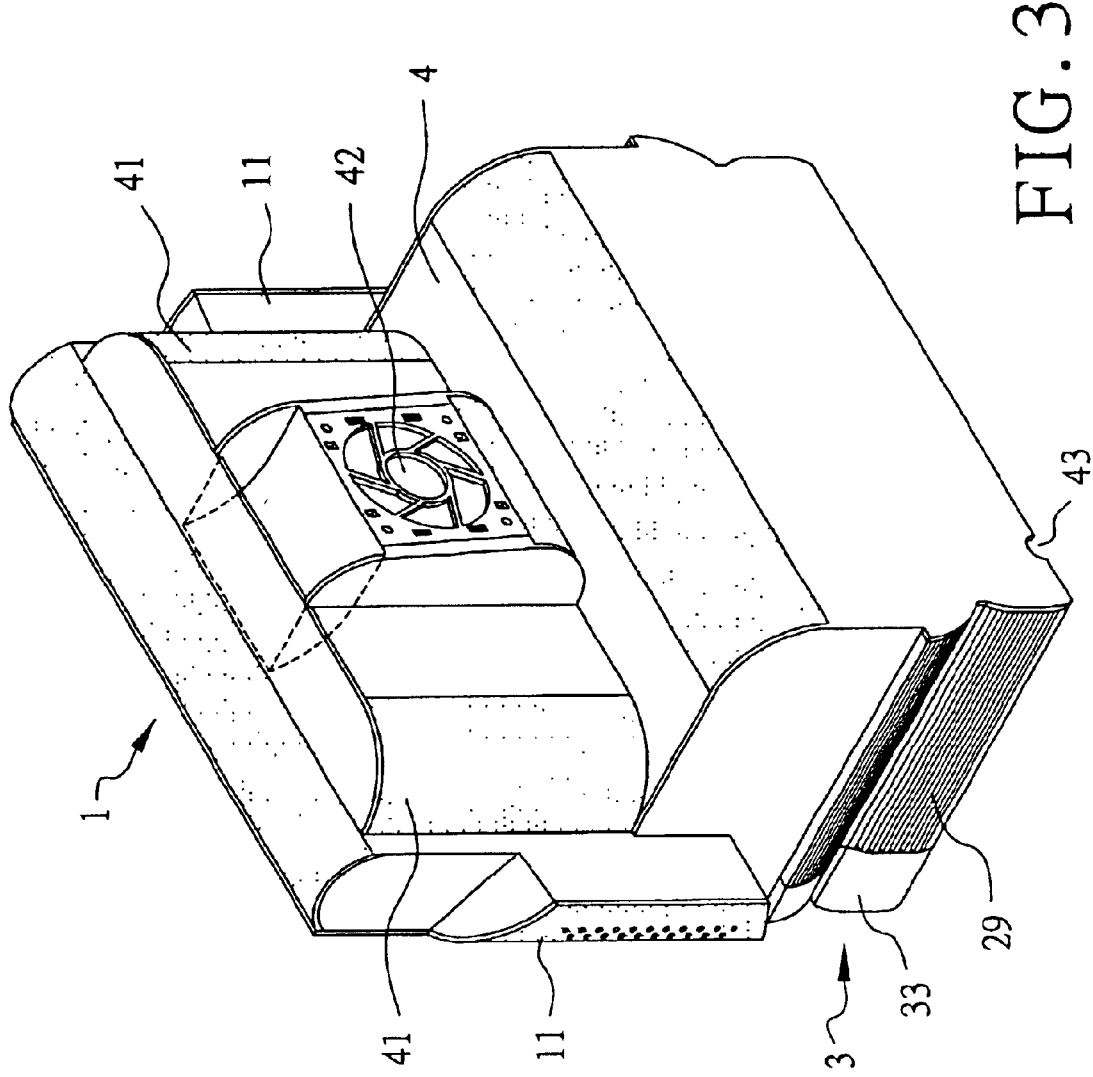
FIG. 3 is a perspective view of the fully assembled computer taken from the rear.
Figure 4:
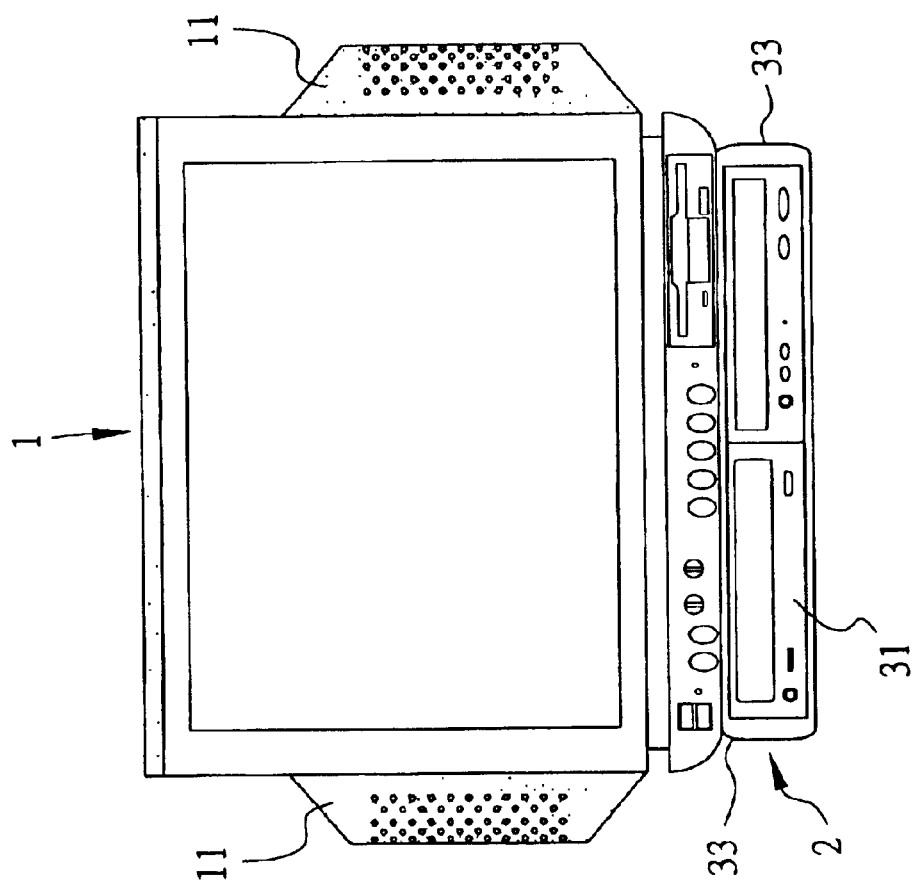
FIG. 4 is a front view of the computer.
Figure 5:
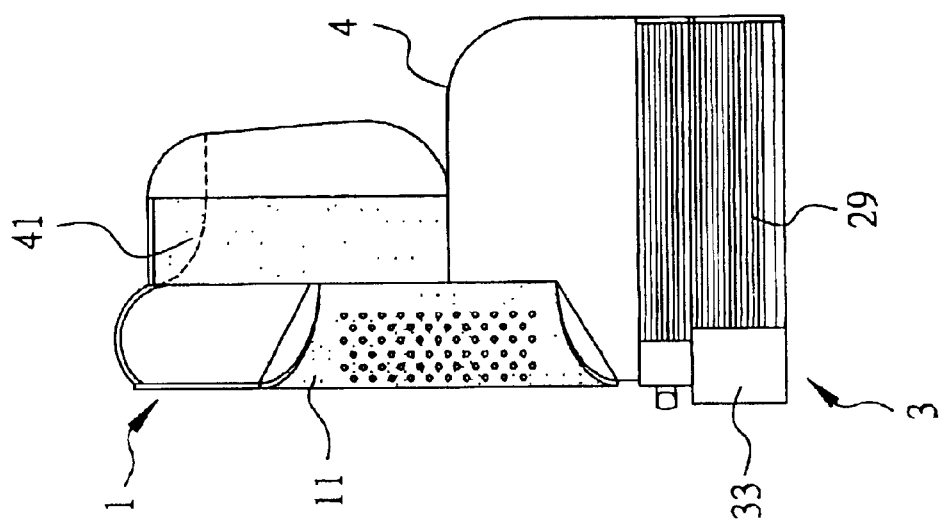
FIG. 5 is a side view of the computer.
Figure 6:
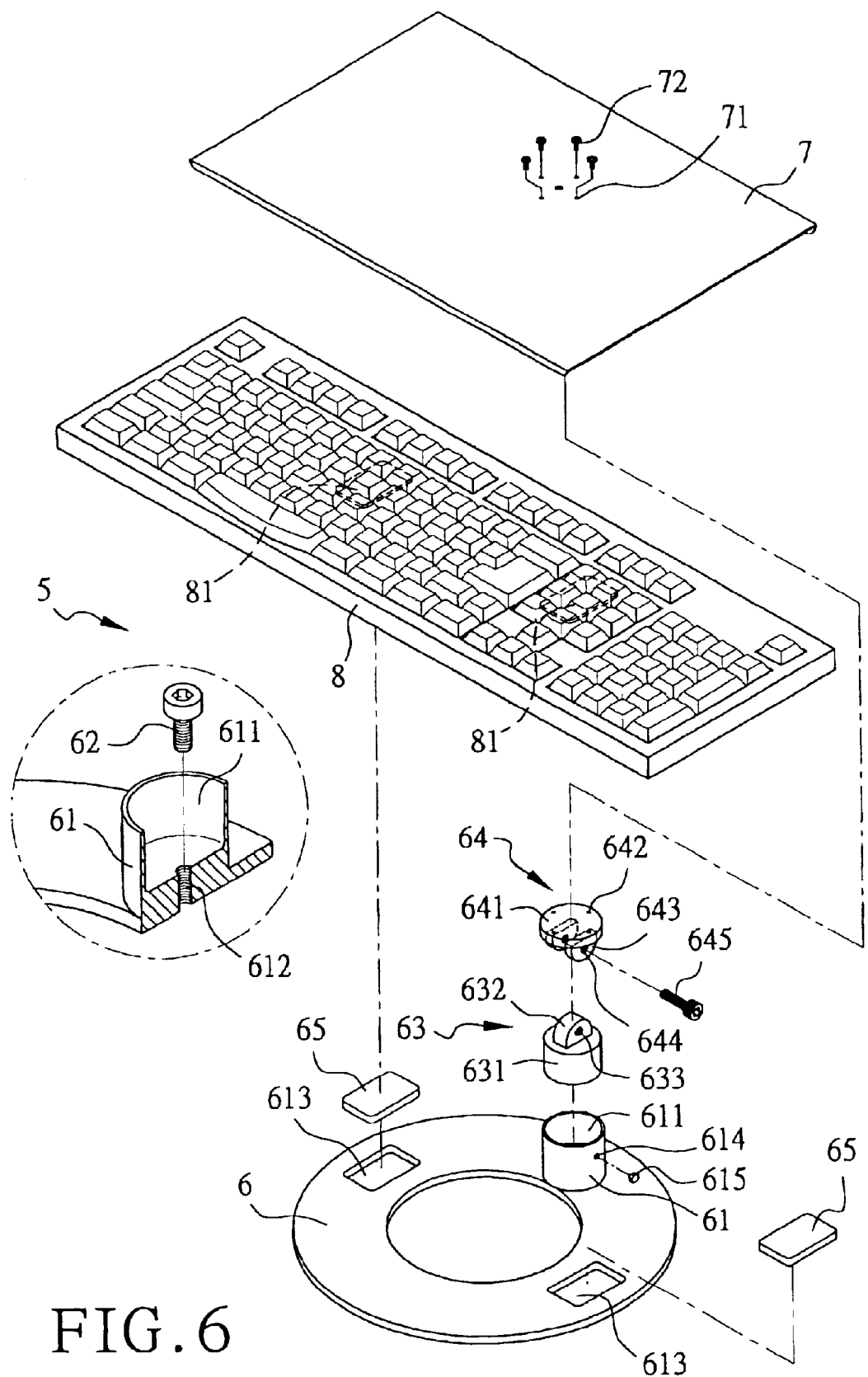
FIG. 6 is an exploded view of support device of a second preferred embodiment of an integral computer according to the invention and keyboard.
Figure 7:
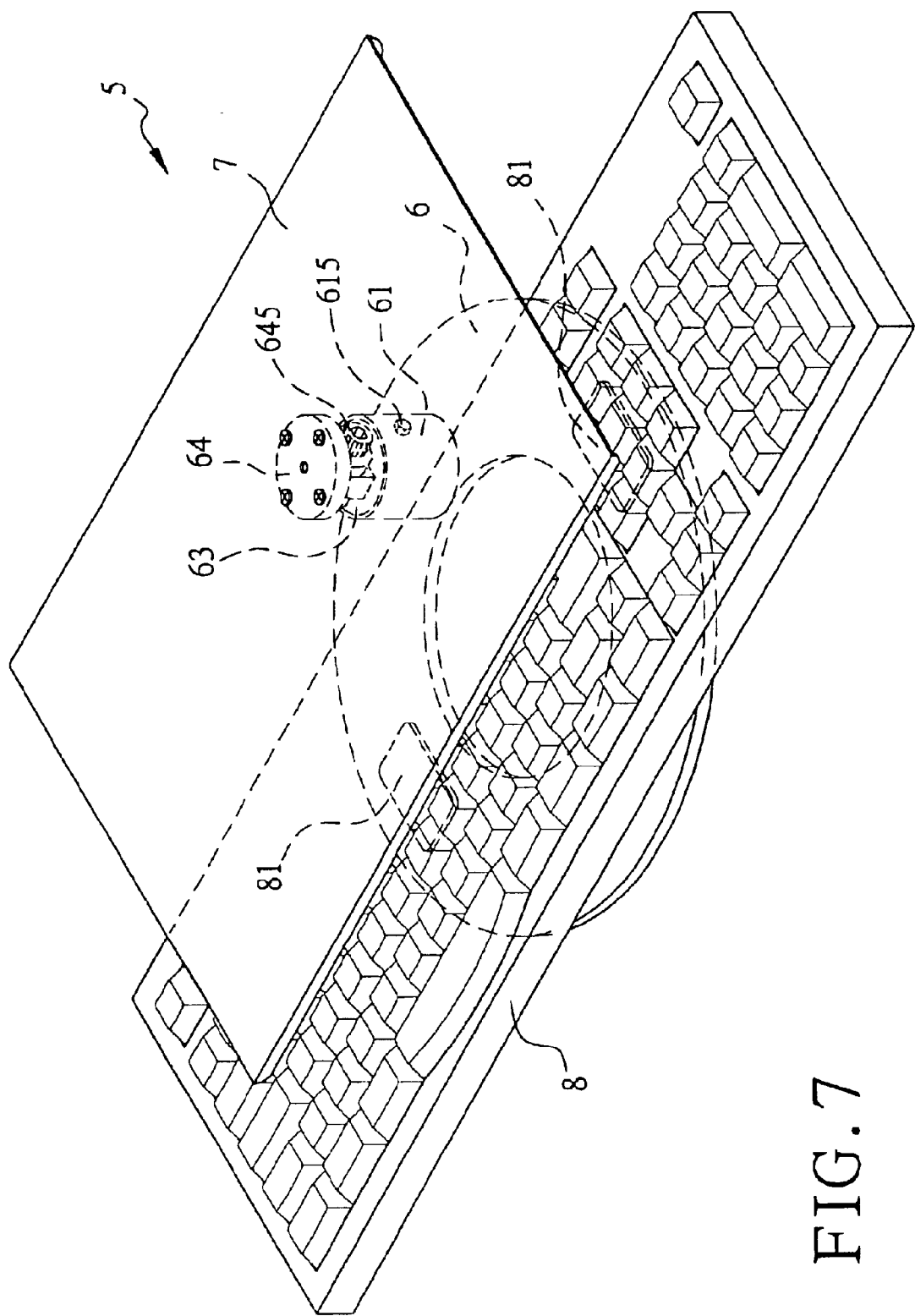
FIG. 7 is a perspective view of the assembled support device and keyboard shown in FIG. 6.
Figure 8:
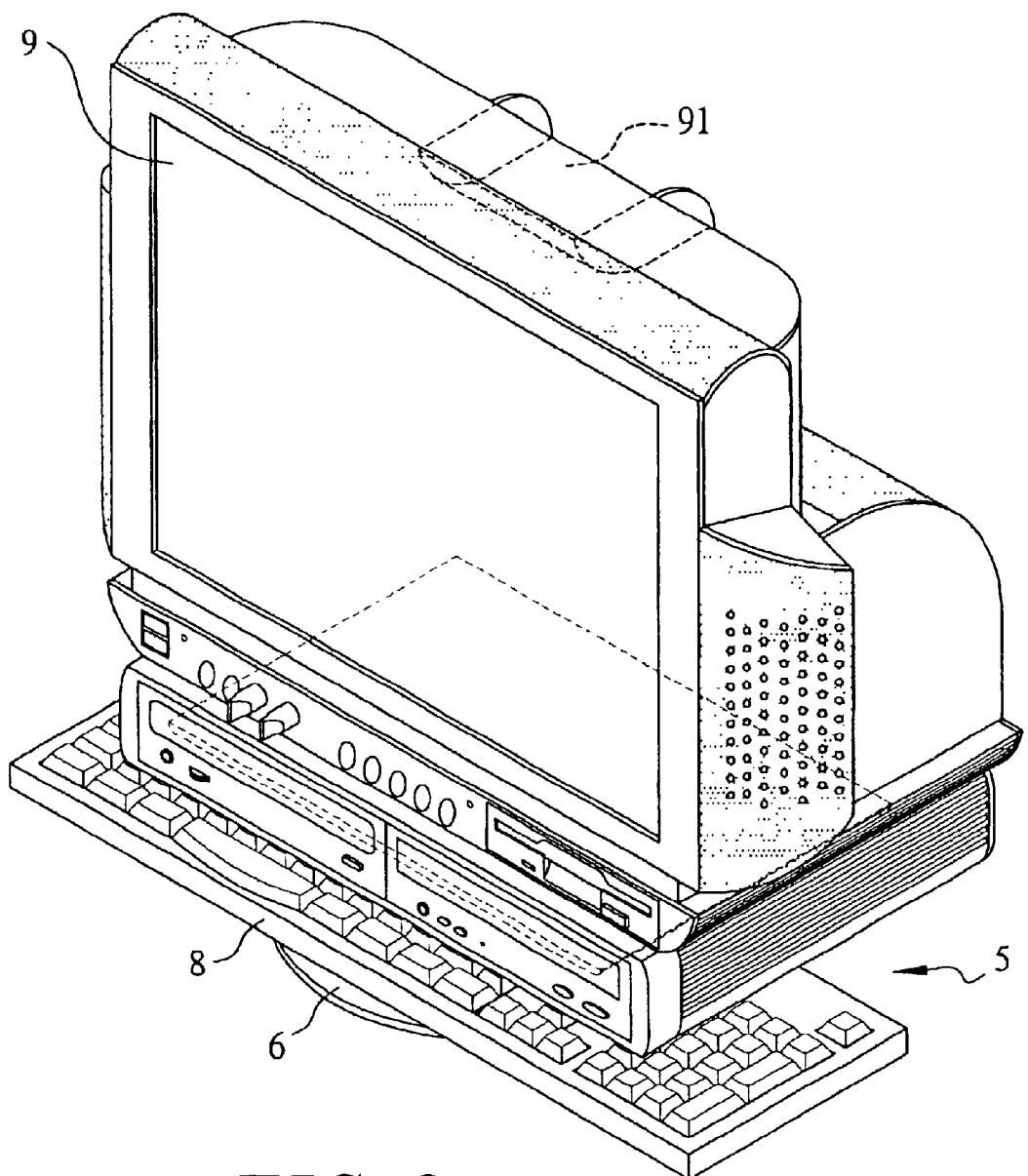
FIG. 8 is a perspective view of the assembled computer of the second preferred embodiment of the invention.
Figure 9:
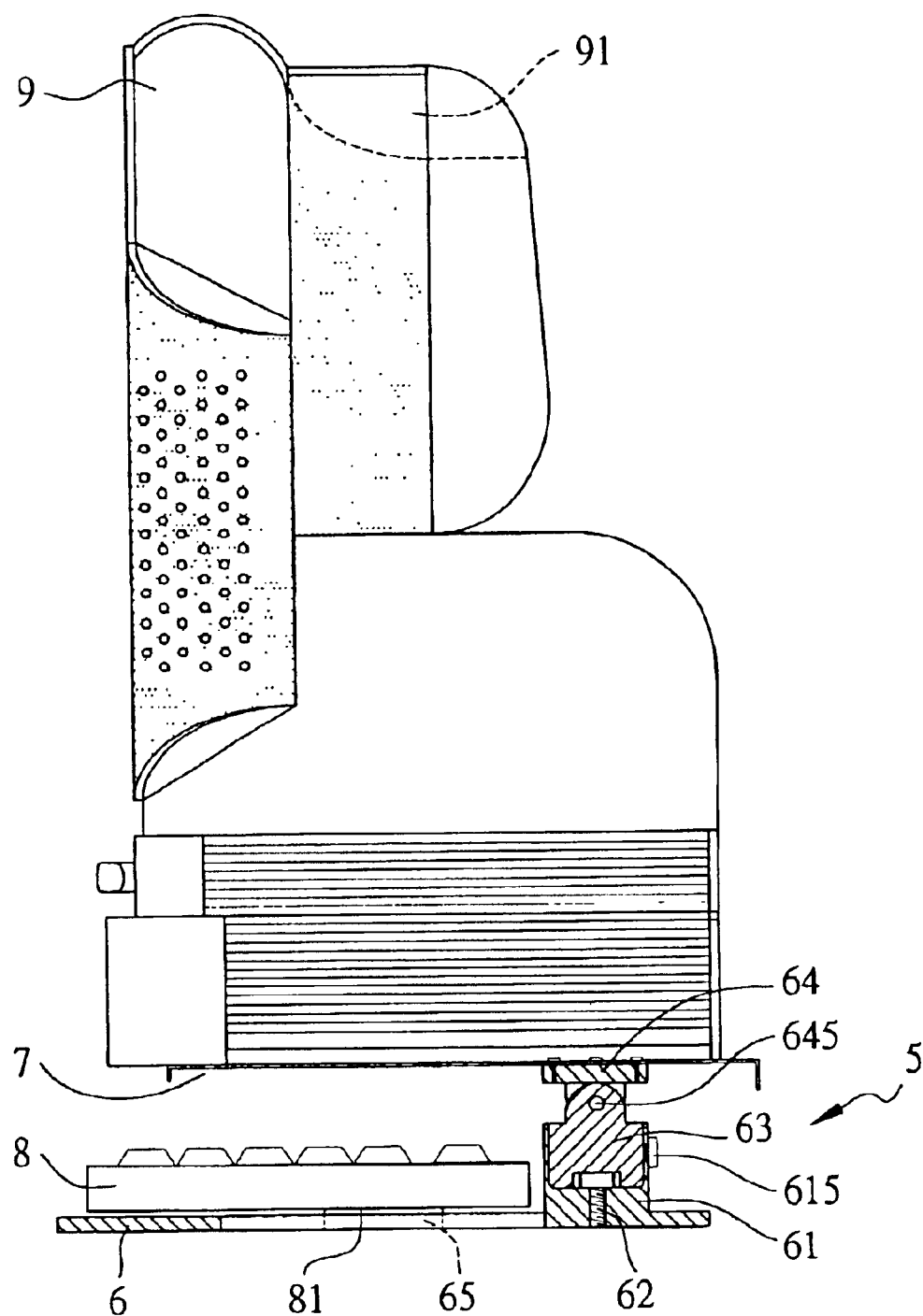
FIG. 9 is side view in part section of the computer shown in FIG. 8.

Referring to FIGS. 1 to 5, there is shown an integral computer constructed in accordance with a first preferred embodiment of the invention comprising a keyboard (not shown), a monitor and computer assembly 1 comprising two side speakers 11, a motherboard 12 having a plurality of expansion slots 14, and a CPU cooler 13; a modular assembly 2 mounted under the monitor and computer assembly 1 by means of fasteners and comprising a plurality of parallel aluminium racks 21, 22, and 23 from top to bottom, the first rack 21 being used as a bottom plate for supporting the monitor and computer assembly 1, a first space 25 formed between the first and second racks 21 and 22 for receiving one or two hard disk drives 20 and a floppy disk drive 30, a second space 26 formed between the second and third racks 22 and 23 for receiving an uninterruptable power supply (UPS) 40 and a CD-ROM or CD-R 50, a third space 24 above the first rack 21 at one side for receiving a power supply 10, a fourth space 27 above the first rack 21 at the other opposite side for receiving a number of cables 28 interconnecting the monitor and computer assembly 1 and a printer, a scanner, or the like, and a plurality of vent openings 29 at either side for communicating the modular assembly 2 with outside; a frame mechanism 3 sized to partially surround the modular assembly 2 and comprising a front panel 31, a plurality of holes 32 on the front panel 31 for receiving sockets and/or ports on the front side of the modular assembly 2, and a wing plate 33 at either side for clinging onto the modular assembly 2; and a rear cover 4 for enclosing the rear of the integral computer and comprising two side cabinets 41 for enclosing the speakers 11 an intermediate opening 42 facing the CPU cooler 13 for ventilation, and a rear aperture 43 for permitting the cables 28 to pass through. An assembled integral computer is shown in FIG. 3. A unique characteristic of the invention is the provision of the plurality of spaces 24, 25, 26, and 27 in which one or more of them can be reserved for future expansion such as installations of a network adapter, a voice card, a 3D acceleration card, or the like.

Referring to FIGS. 6 to 9, there is shown an integral computer constructed in accordance with a second preferred embodiment of the invention. The differences between the first and second preferred embodiments are the addition of a support device and two spaced rectangular metal members 81 on the bottom of keyboard 8 in the latter as detailed below. The support device 5 is mounted under the computer and comprises a ring-shaped pedestal 6 comprising a shell 61 on top having a bore 611, a bottom thread hole 612, a side hole 614, and a screw 615 driven through the hole 614, a set screw 62 driven into the thread hole 612, two opposite rectangular openings 13, a cylindrical first connection mechanism 63 sized to fit into the bore 611 and including a cylindrical portion 631 being rested on the screw 62 and fastened by the screw 615, a top lug 632, and a lateral hole 633 through the lug 632, a second connection mechanism 64 including a top disk 641, a plurality of equally spaced peripheral holes 642 on the disk 641, two spaced lugs 643 extended downward from the disk 641 for tightly receiving the lug 632 therebetween, each lug 643 having a through hole 644, and a screw 645 driven through the holes 644 and 633 for fastening the first and the second connection mechanisms 63 and 64 together, and two rectangular magnetic members 65 fitted into the openings 613, the magnetic members 65 being releasably, magnetically coupled to the metal members 81 on the bottom of the keyboard 8; and a rectangular support plate 7 integrally formed with the computer, the support plate 7 having a plurality of equally spaced peripheral holes 71 and a plurality of screws 72 driven through the holes 71 and 642 to fasten the support plate 7 and the pedestal 6 together.

Adjustment of monitor 9 angle about a supporting ground (e.g., a desk with the first connection mechanism 6 supported thereon) comprises slightly loosening the screw 645, pivoting the monitor 9 until a desired angle is reached (i.e., adjusting a relative angle of the second connection mechanism 64 about the first connection mechanism 63), and fastening the screw 645 again. As to a horizontal turning of the computer, it comprises loosening the screw 615, turning the computer until a desired degree is reached (i.e., adjusting a relative position of the first connection mechanism 63 about the shell 61), and fastening the screw 615 again. A height adjustment of the computer (i.e., monitor 9) comprises unfastening the screw 615 for removing the first connection mechanism 63 from the bore 611, adjusting the screw 62 in the hole 612 to leave a desired portion of the shank of the screw 62 therein, and putting the first connection mechanism 63 in the bore 611 again prior to fastening the screw 615. As to movement of the computer, it comprises placing the keyboard 8 on the pedestal 6 to cause the metal members 81 to be magnetically attracted by the magnetic members 65 prior to carrying the whole computer to a desired location by taking two recesses 91 on the monitor 9.

While the invention has been described by means of specific embodiments, numerous modifications and variations could be made thereto by those skilled in the art without departing from the scope and spirit of the invention set forth in the claims.

What is claimed:

1. An integral computer comprising:

a keyboard;

a monitor and computer assembly comprising a monitor, two side speakers, and a motherboard;

a modular assembly disposed below the monitor and computer assembly and comprising a plurality of parallel first, second, and third racks from top to bottom wherein the first rack is used as a bottom plate for supporting the monitor and computer assembly, a first space formed between the first and the second racks for receiving a plurality of first electronic devices including at least one hard disk drive and a floppy disk drive, a second space formed between the second and the third racks for receiving a plurality of second electronic devices including a CD-ROM, a third space above the first rack at one side for receiving a plurality of third electronic devices including a power supply, a fourth space above the first rack at the other opposite side for receiving a plurality of cables interconnecting the monitor and computer assembly and a plurality of fourth electronic devices including a printer, a plurality of ports in the front, and a plurality of vent openings at either side for ventilation; and a frame mechanism sized to partially surround the modular assembly and comprising a front panel, a plurality of holes on the front panel for receiving the ports, and a wing plate at either side for clinging onto the modular assembly; and a rear cover comprising two side cabinets for enclosing the speakers and an intermediate opening for ventilation;

wherein one or more of the plurality of spaces are reserved for future expansion.

2. An integral computer comprising:

a keyboard having two spaced metal members on a bottom;

a monitor and computer assembly comprising a monitor, two side speakers, and a motherboard;

a modular assembly disposed below the monitor and computer assembly and comprising a plurality of parallel first, second, and third racks from top to bottom wherein the first rack is used as a bottom plate for supporting the monitor and computer assembly, a first space formed between the first and the second racks for receiving a plurality of first electronic devices including at least one hard disk drive and a floppy disk drive, a second space formed between the second and the third racks for receiving a plurality of second electronic devices including a CD-ROM, a third space above the first rack at one side for receiving a plurality of third electronic devices including a power supply, a fourth space above the first rack at the other opposite side for receiving a plurality of cables interconnecting the monitor and computer assembly and a plurality of fourth electronic devices including a printer, a plurality of ports in the front, and a plurality of vent openings at either side for ventilation;

a frame mechanism sized to partially surround the modular assembly and comprising a front panel, a plurality of holes on the front panel for receiving the ports, and a wing plate at either side for clinging onto the modular assembly;

a rear cover comprising two side cabinets for enclosing the speakers and an intermediate opening for ventilation; and a lower support device comprising a pedestal comprising a shell on a top having a bore, a bottom thread hole, a side hole, and a first fastener driven through the side hole, a second fastener driven into the thread hole, two opposite openings, a cylindrical first connection mechanism sized to fit into the bore and including a cylindrical portion being rested on the second fastener and fastened by the first fastener, a top lug, and a lateral hole through the top lug, a second connection mechanism including a top disk, two spaced lower lugs for tightly receiving the top lug therebetween, each lower lug having a through hole, and a third fastener driven through the through holes of the lower lugs and the lateral holes of the top lug for fastening the first and the second connection mechanisms together, and two magnetic members fitted into the openings, the magnetic members being releasably, magnetically coupled to the metal members; and a support plate integrally formed with a bottom of the computer, the support plate being secured to the second connection mechanism;

wherein one or more of the plurality of spaces are reserved for future expansion; an angle adjustment of the monitor about the first connection mechanism is done by unfastening the third fastener, pivoting the monitor until a predetermined angle is reached, and fastening the third fastener; a horizontal turning of the computer is done by unfastening the first fastener, turning the computer until a predetermined degree is reached, and fastening the first fastener; a height adjustment of the computer is done by unfastening the first fastener for removing the first connection mechanism from the bore, adjusting the second fastener to leave a predetermined portion thereof in the bottom thread hole, and putting the first connection mechanism in the bore prior to fastening the first fastener; and a movement of the computer is done by placing the keyboard on the pedestal to magnetically attract the metal members by the magnetic members prior to carrying the computer to a predetermined location.

3. The integral computer of claim 2, wherein the monitor comprises two recesses.

* * * * *